United States Patent [19]

Marble et al.

[11] Patent Number: 5,332,506
[45] Date of Patent: Jul. 26, 1994

[54] WATER CLARIFICATION

[75] Inventors: Robert A. Marble, Sugar Land, Tex.; Timothy L. Sweeney, Houma, La.

[73] Assignee: Nalco Chemical Company, Naperville, Ill.

[21] Appl. No.: 165,690

[22] Filed: Dec. 13, 1993

[51] Int. Cl.⁵ ................................. C02F 1/56
[52] U.S. Cl. ..................... 210/705; 210/708; 210/728; 210/734; 210/735; 166/267
[58] Field of Search ............ 210/705, 708, 728, 734, 210/735, 698, 701; 166/266, 267

[56] References Cited

U.S. PATENT DOCUMENTS

| | | | |
|---|---|---|---|
| 4,507,208 | 3/1985 | Simon et al. | 210/721 |
| 4,588,508 | 5/1986 | Allenson et al. | 210/708 |
| 4,929,655 | 5/1990 | Takeda et al. | 528/458 |
| 5,006,590 | 4/1991 | Takeda et al. | 528/458 |
| 5,045,587 | 9/1991 | Tanaka | 524/310 |
| 5,128,046 | 2/1992 | Marble et al. | 210/708 |

*Primary Examiner*—Cynthia L. Nessler
*Attorney, Agent, or Firm*—Robert A. Miller; Joseph B. Barrett; James J. Drake

[57] ABSTRACT

The invention provides a method of recovering water from an acid workover, the water including dispersed solids and emulsified oil. According to the method, the water is treated with an effective amount of a dispersion of a water-soluble cationic polymer.

7 Claims, No Drawings

WATER CLARIFICATION

BACKGROUND OF THE INVENTION

The stimulation of oil or gas production by injecting a diluted acid solution into a nonproducing or damaged formation is known as acidizing. The diluted acid solution enlarges the flow channels by dissolving corrosion products, scale, mud and/or a portion of the formation. Then, the oil or gas passes through to the wellbore increasing the well's production.

It is well recognized that oil/water separation becomes significantly more challenging when production fluids from acid workovers are introduced into the system. Following are some of the causes and prior solutions to water treating problems during upsets induced by acid flowbacks.

The cause of the oil/water separation problem is generally attributed to the following factors:
1. poor dissolution of oil-external latex polymers in low pH water;
2. increased polymer demand due to solids; and
3. solids build-up at the interface in oil-treating vessels.

All these factors contribute to carryover of oil and/or unresolved emulsion into the water. Under normal conditions, high charge, high molecular weight oil external latex polymers are used for water clarification. However, these polymers have reduced solubility during acid flowbacks. These oil-external solutions must "invert", that is, the polymer must dissolve into the water, and the polymers chains become disentangled for maximum efficiency. Increased agitation and residence time can assist in this inversion process, but often during acid flowbacks a small amount of the latex polymer is left uninverted. As chemical dosages are increased to handle elevated levels of contaminants there is generally a maximum level, above which uninverted polymer can actually contribute to chemical sheening as you have observed. Thus, solubility of the polymer is a factor in selection of the optimal product.

Dissolved species, including various silicates, carbonates, and oxide/hydroxides of iron and calcium, can become destabilized as the pH of the solution rises, either as the solution becomes "spent" or is co-mingled with produced water buffered at a higher pH. Furthermore, solids, including sands and silt and scale particles can also be dispersed into the water during the treatment. The resultant increase in solids, often oil-coated, can create a significant increase in the polymer demand of the system, or create a need for a different coagulant and/or flocculant treatment to effectively clarify the water.

Furthermore, these solids contribute to the formation of tight emulsions during the acid workover. The same solids, oil-wetted, often accumulate at the interface in treating vessels, building pads or severely irregular interfaces. As these can be drawn into the water dump from these vessels, carryover of dispersed or emulsified oil into the water can occur.

Sheening can often occur, even though residual oil is within discharge specifications. The sheening may be linked to very fine solids, often oil coated, which are not removed in the water clarification stage. For example, soluble iron species can precipitate as they become exposed to the oxygen-rich ocean waters, serving as a seed to flocculate the remaining low-level oil. Sheening has also been attributed to uninverted polymer which can carry through the system, but continue to dissolve as it dilutes into the ocean water, again flocculating the very low levels of oil in the discharge water, or releasing the low level of hydrocarbon solvents contained in the polymer.

There are several components of the drilling program which are carefully designed to mitigate these problems. Acetic acid which is used to buffer the water at an intermediate acidity to keep many of these species in solution until they can pass through the system, to minimize extremes of pH. At very low pH, precipitation of asphaltenes is aggravated, while at high pH's, various scalants will more rapidly precipitate. Acetic acid, along with chelants, also help to keep various iron species in solution.

Nonionic surfactants are used to minimize the generation of solid-stabilized emulsions during the drilling and acidizing. Prevention of these emulsions, by addition of these non-emulsifiers, is one treatment to remove the residual oil from the water, but is not sufficient.

The low pH and solids discussed above contribute to increased polymer demand for the water clarification system. Under these conditions, highly charged oil-external latex polymers are no longer the most efficient treatment. The polymers of the invention are generally more efficient water clarifiers, often requiring substantially lower dosages to achieve required water clarity. The polymers of the invention have been demonstrated to function during such pH and solid upsets. These polymers are typically far more soluble in brine, especially at lower pH, and can be fed at higher levels to meet the increased polymer demand during these upsets.

The water-soluble dispersion polymers of the invention offer many solutions to these problems and represent a new method for recovering oil from water during or after an acid workover.

SUMMARY OF THE INVENTION

One aspect of the invention provides a method for the recovering water during or after an acid workover, by removing solids and emulsified oil from the water. According to the method, the water oil fluid is treated with an effective amount of a dispersion of a water-soluble cationic polymer. The dispersion of the water-soluble cationic polymer is prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt. The polymerization is carried out in the presence of a dispersant polymer. The dispersant polymer is a water-soluble cationic polymer which is soluble in the aqueous solution of the polyvalent anionic salt. Also, the dispersant polymer contains at least 20 mole % of cationic monomer units represented by general formula (II):

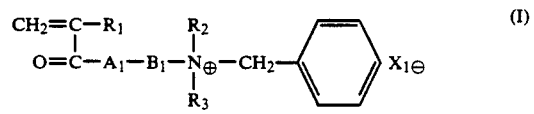

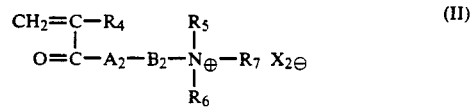

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1$—and $X_2$—are each a counter anion.

A further aspect of the invention provides that the polymerization is further carried out in the presence of a seed polymer. The seed polymer is a water-soluble cationic polymer which is insoluble in the aqueous solution of the polyvalent anionic salt. The seed polymer also contains at least 5 mole % of cationic monomer units represented by the general formula (I).

According to one preferred embodiment, the water-soluble monomer mixture further contains at least 5 mole % of a cationic monomer represented by the general formula (II). The multivalent anionic salt preferably comprises a phosphate, a sulfate or a mixture thereof.

DESCRIPTION OF THE PREFERRED EMBODIMENTS

The invention provides a superior method for recovering water during or after an acid workover by removing the solids and emulsified oil from the water. A new class of water-soluble dispersion polymers have been discovered to be more effective in removing solids and emulsified oil from water during or after an acid workover than currently available chemical treatments. As will be discussed in more detail below, the polymer dispersion of the invention is prepared in an aqueous solution of a polyvalent anionic salt. The polymer dispersion of achieves fine particle sizes and aqueous solubilities not available with other polymers used for this application.

The dispersion polymers of the invention offer numerous advantages which have previously been unavailable. The polymers are synthesized entirely in water and, unlike latex polymers, there is no oil solvent. This is important since: the polymers do not present a fire hazard; an additional oil is not added to the water which is to be treated; dissolution of the polymer requires only the addition of water-no special activators are needed; the ability for these materials to dissolve/invert is superior to that of oil dispersion latexes; and the polymers may be diluted to virtually any concentration by using appropriately concentrated salt water. Another major advantage is that the bulk viscosity of the polymer is low, unlike some oil dispersion latex polymers. This physical property enables any standard chemical pump to deliver the material at the injection site.

According to the method, the polymers of the invention are added to an acid flowback stream during or after an acid workover. The polymers are added in an effective amount of from 0.5 to about 500 ppm. More preferably, the amount of the polymer added in the water is from 1 to about 200 ppm; and most preferably from about 5 to about 100 ppm. It should be noted, however, that there does not appear to be a maximum dosage at which the polymers adversely affect the system. It does appear that at some higher doses the beneficial affect plateaus, and on a cost basis such higher doses, probably above about 500 ppm, are not cost effective. The polymers of the invention are preferably added to the system in neat form. However, in some applications, the polymers can be added as an aqueous solution, such as a 1% aqueous solution.

Once the polymers of the invention are added to the acid flowback water recovery stream, the treated water is preferably agitated. The polymers of the invention will cause the dispersed solids and the emulsified oil to separate from the water and rise to the top of the vessel as a floc or scum. The solids are subsequently removed from the vessel and usually landfilled. The water may be clean enough to use again or to discharge to the environment, or may be sent to a wastewater treatment plant. The treated water can now be recovered or recycled into the oil recovery process.

The preferred polymers of the invention are manufactured by Hymo Corporation, Japan. Preferred polymer preparations are available from Hymo Corporation under the trade name designations DR-2570, DR-3000 and DR-4000. Methods for manufacturing the polymer dispersion used in the invention is described in detail in U.S. Pat. Nos. 5,006,590 and 4,929,655, assigned to Kyoritsu Yuki Co., Ltd., Tokyo, Japan. The disclosures of these two patents are incorporated herein.

According to the invention, the polymer dispersion used to treat the produced water is prepared from a water-soluble monomer mixture containing at least 5 mole % of a cationic monomer represented by the general formula (I):

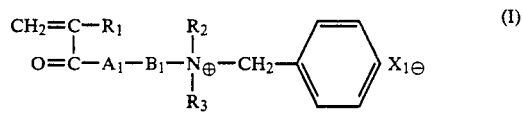

wherein $R_1$ is H or $CH_3$; $R_2$ and $R_3$ are each an alkyl group having 1 to 2 carbon atoms; $A_1$ is an oxygen atom or NH; $B_1$ is an alkyl group having 2 to 4 carbon atoms or a hydroxypropyl group and $X_1$ is a counter anion. The above water-soluble monomer mixture is soluble in the aqueous solution of the polyvalent anionic salt. The polymer generated from the monomer mixture is, however, insoluble in the aqueous polyvalent anionic salt solution. The polymer of the monomer mixture can also be used as the seed polymer. The seed polymer is described in detail below.

The above cationic monomer represented by the general formula (I) preferably is a quaternary ammonium salt obtained by the reaction of benzyl chloride and dimethylaminoethyl acrylate, diethylaminoethyl acrylate, dimethylaminohydroxypropyl acrylate, dimethylaminopropyl acrylamide, dimethylaminoethyl methacrylate, dimethylaminoethyl methacrylate, diethylaminoethyl methacrylate and dimethylaminopropyl methacrylamide.

Monomers preferably copolymerized with the cationic monomer represented by the general formula (I) includes acrylamide, methacrylamide and the cationic monomers represented by the general formula (II):

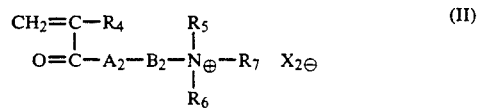

wherein $R_4$ is H or $CH_3$; $R_5$ and $R_6$ are each an alkyl group having 1 to 2 carbon atoms; $R_7$ is H or an alkyl group having 1 to 2 carbon atoms; $A_2$ is an oxygen atom or NH; $B_2$ is an alkyl group having 2 to 4 carbon atoms or a hydroxypropyl group and $X_2$ is a counter anion.

Preferable monomers represented by the formula (II) include the ammonium salts of dimethylaminoethyl acrylate, diethylaminoethyl acrylate, dimethylaminopropyl acrylamide, diethylaminopropyl acrylamide and dimethylhydroxypropyl acrylate, dimethylaminoethyl methacrylate, diethylaminoethyl methacrylate, dimethylaminopropyl methacrylamide, diethylaminopropyl methacrylamide and dimethylhydroxypropyl methacrylate as well as the methylated and ethylated quaternary salts. Among the more preferable cationic monomers represented by the general formula (II) are the salts and methylated quaternary salts of dialkylaminoethyl acrylate and dialkylaminoethyl methacrylate. The concentration of the above-mentioned monomers in the polymerization reaction mixture is suitably in the range of 5 to 30% by weight.

The polyvalent anionic salt to be incorporated in the aqueous solution according to the present invention is suitably a sulfate, a phosphate or a mixture thereof. Preferable salts include ammonium sulfate, sodium sulfate, magnesium sulfate, aluminum sulfate, ammonium hydrogenphosphate, sodium hydrogenphosphate and potassium hydrogenphosphate. In the present invention, these salts may be each used as an aqueous solution thereof having a concentration of 15% or above.

A dispersant polymer is present in the aqueous anionic salt solution in which the polymerization of the above monomers occurs. The dispersant polymer is a water-soluble high molecular weight cationic polymer. The dispersant polymer is soluble in the above-mentioned aqueous salt solution. The dispersant polymer is preferably used in an amount of from 1 to 10% by weight based on the total weight of the monomers. The dispersant polymer is composed of 20 mole % or more of cationic monomer units represented by the formula (II). Preferably the residual mole % is acrylamide or methacrylamide. The performance of the dispersant is not greatly affected by molecular weight. However, the molecular weight of the dispersant is preferably in the range of 10,000 to 10,000,000. According to one embodiment of the invention a multifunctional alcohol such as glycerin or polyethylene glycol is coexistent in the polymerization system. The deposition of the fine particles is smoothly carried out in the presence of these alcohols.

For the polymerizations, a usual water-soluble radical-forming agent can be employed, but preferably water-soluble azo compounds such as 2,2'-azobis(2-amidinopropane) hydrochloride and 2,2'-azobis(N,N'-dimethyleneisobutylamine) hydrochloride are used.

According to one embodiment of the invention, a seed polymer is added before the beginning of the polymerization of the above monomers for the purpose of obtaining a fine dispersion. The seed polymer is a water-soluble cationic polymer insoluble in the aqueous solution of the polyvalent anionic salt. The seed polymer is preferably a polymer prepared from the above monomer mixture by the process described herein. Nevertheless, the monomer composition of the seed polymer need not always be equal to that of the water-soluble cationic polymer formed during polymerization. However, like the water-soluble polymer formed during polymerization, the seed polymer should contain at least 5 mole percent of cationic monomer units represented by the general formula (I). According to one embodiment of the invention, the seed polymer used in one polymerization reaction is the water-soluble polymer prepared in a previous reaction which used the same monomer mixture.

The following Example is presented to described preferred embodiments and utilities of the invention and are not meant to limit the invention unless otherwise stated in the claims appended hereto.

EXAMPLE 1

A sample of water was obtained from an acid flowback at an offshore oilwell in the Gulf of Mexico. The water contained dissolved solid and from 1,000 to 10,000 ppm of emulsified oil.

Gas flotation tests were used to evaluate the invention. Vessels were filled with 2,500 ml of the collected water. The chemical treating agents, listed in Table 1 below, were added at the listed dosages. The dosages for each chemical treating agent are listed in Table 1 in parts per million. The vessels were agitated at 1,800 rpm for one minute to allow the treating agents to flocculate the oil to the surface. After the vessels were agitated, 100 ml was collected from below the surface of the flocculated oil and was placed in a six ounce bottle for observation. The clarity of the water was recorded. A portion of the water was then removed from the bottle, extracted with FREON® and analyzed by infrared spectroscopy to determine residual oil in ppm.

Referring to the data summarized in Table 1 below, the treating agents were: NALCO® 3390 and DR-3000. NALCO 3390 is a latex polymer preparation which is generally used in combination with other chemical treatments to treat recovered water from acid workovers. DR-3000 is a commercial preparation of the polymers of the present invention obtained from the Hymo Corporation, Japan. As shown in the data, oil and solids were substantially removed by the DR-3000 chemical treatment. Clarity was also dramatically improved by the DR-3000 chemical treatment.

TABLE 1

| Chemical | Dosage PPM | Residual Oil PPM | Comments |
|---|---|---|---|
| DR-3000 | 12 | 34 | Clear Water |
| DR-3000 | 36 | 17 | Excellent |
| DR-3000 | 72 | 12 | Excellent |
| NALCO 3390 1% | 16 | 60 | Slight Haze |
| DR-3000 Neat | 16 | 96 | Very Hazy |
| DR-3000 Neat | 48 | 23 | Excellent |
| NALCO 3390 Neat | 16 | >184 | Very Hazy |
| NALCO 3390 Neat | 48 | 184 | Very Hazy |

Changes can be made in the composition, operation and arrangement of the method of the present invention described herein without departing from the concept and scope of the invention as defined in the following claims:

We claim:

1. A method of recovering water during or after an acid workover which includes dispersed solids and emulsified oil, the method comprising the step of treating the water with an effective amount of a dispersion of a water-soluble cationic polymer, said dispersion of the water-soluble cationic polymer being prepared by polymerizing a water-soluble monomer mixture containing at least 5 mole % of a cationic monomer represented by general formula (I) and at least 5 mole % of acrylamide or methacrylamide in an aqueous solution of a polyvalent anionic salt, said polymerization is carried out in the presence of a dispersant polymer, said dispersant polymer being a water-soluble cationic polymer which is soluble in said aqueous solution of the polyvalent anionic salt and which contains at least 20 mole % of cationic monomer units represented by a general formula (II):

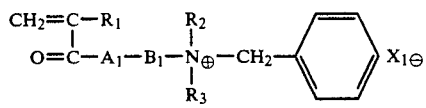
(I)

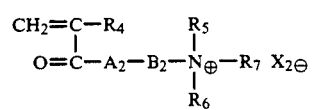
(II)

wherein $R_1$ and $R_4$ are each H or $CH_3$; $R_2$, $R_3$, $R_5$ and $R_6$ are each an alkyl group having 1 to 2 carbon atoms; $R_7$ is a hydrogen atom or an alkyl group having 1 to 2 carbon atoms; $A_1$ and $A_2$ are each an oxygen atom or NH; $B_1$ and $B_2$ are each 2 to 4 carbon atoms or a hydroxypropyl group and $X_1-$ and $X_2-$ are each a counter anion.

2. The method of claim 1 wherein said polymerization is further carried out in the presence of a seed polymer; said seed polymer being a water-soluble cationic polymer which is insoluble in said aqueous solution of the polyvalent anionic salt and which contains at least 5 mole % of cationic monomer units represented by the general formula (I).

3. The method of claim 1 wherein the water-soluble monomer mixture further contains at least 5 mole % of a cationic monomer represented by the general formula (II).

4. The method of claim 1 wherein the multivalent anionic salt comprises a phosphate, a sulfate or a mixture thereof.

5. The method of claim 1 wherein the effective amount of the dispersion of the water-soluble cationic polymer added to the water is at least 0.5 ppm.

6. The method of claim 1 wherein the effective amount of the dispersion of the water-soluble cationic polymer added to the water is at least 5 ppm.

7. The method of claim 1 wherein the effective amount of the dispersion of the water-soluble cationic polymer added to the water is at least 10 ppm.

* * * * *